United States Patent [19]
McCanse et al.

[11] Patent Number: 5,339,926
[45] Date of Patent: Aug. 23, 1994

[54] VEHICLE SERVICE LIFT

[75] Inventors: James E. McCanse; Richard L. McCanse, both of Oregon; Timothy K. Fulmer, Dixon, all of Ill.

[73] Assignee: McCanse Engineering, Incorporated, Oregon, Ill.

[21] Appl. No.: 69,406

[22] Filed: Jun. 1, 1993

[51] Int. Cl.$^5$ .............................................. B60S 13/00
[52] U.S. Cl. .................................. 187/8.47; 187/8.75; 403/401
[58] Field of Search .................. 187/8.41, 8.43, 8.47, 187/8.49, 8.5, 8.67, 8.74, 8.75, 8.52, 9 R, 9 E; 414/785; 403/401, 402, 270, 271; 254/90, 89 R, 93 H, 2 R, 2 B

[56] References Cited
U.S. PATENT DOCUMENTS

| | | | |
|---|---|---|---|
| 2,796,642 | 6/1957 | Woodworth | 403/402 |
| 3,019,858 | 2/1962 | Olson | 187/8.75 |
| 3,052,322 | 9/1962 | Goldzwig | 187/8.75 |
| 3,057,437 | 10/1962 | Sommerer | 187/8.43 |
| 3,271,006 | 9/1966 | Brown et al. | 254/2 |
| 3,405,781 | 10/1968 | Brown | 187/8.41 |
| 4,241,901 | 12/1980 | Shircliffe | 254/89 |
| 4,599,034 | 7/1986 | Kennedy et al. | 414/678 |
| 4,772,172 | 9/1988 | Rosen | 414/240 |
| 4,984,657 | 1/1991 | Burns | 187/8.47 |
| 5,174,414 | 12/1992 | Burns | 187/8.41 |
| 5,207,297 | 5/1993 | Beattie et al. | 187/8.41 |
| 5,269,501 | 12/1993 | Liegel et al. | 269/17 |

FOREIGN PATENT DOCUMENTS 2150112  6/1985  United Kingdom ............... 414/785

OTHER PUBLICATIONS

4-Page Brochure published by Trion Lifts, Inc., Greeley, Colo., in 1991 and entitled Trion Model 1800 Lift.
2-Page Advertisement published by Golf Lift, Fort Worth, Tex. (publication date unknown) and entitled The Original Golf Lift.
2-Page Advertisement published by G&H Products, Division of Riburn, Industries, Inc., St. Paris, Ohio., (publication date unknown) and entitled Uni-Lift Model 390 Maintenance Repair Lift.
1-Page Advertisement published by Specialty Motors Mfg. Co. (publication date unknown) and entitled Super Tractor Lift Model STL-1500.
1-Page Advertisement published by Specialty Motors Mfg. Co. (publication date unknown) and entitled Power Equipment Lift Model PEL-1200.

Primary Examiner—Kenneth W. Noland
Attorney, Agent, or Firm—Leydig, Voit & Mayer

[57] ABSTRACT

A lift for raising vehicles such as garden tractors to a position facilitating servicing of the underside of the vehicle. The lift includes a vertically movable carriage having two cantilevered lift forks which may be adjusted along the carriage to accommodate the longitudinal wheelbase of the vehicle. Each lift fork carries two cups for cradling and supporting the wheels of the vehicle, the cups being adjustable along the forks to conform to the transverse wheelbase of the vehicle. The cups extend away from the forks to allow free access to crucial components of the vehicle and may be reversed on the forks to accommodate relative small variations in longitudinal wheelbases. Safety latches catch the carriage and stop free falling thereof in the event the lift actuator fails. The lift forks are of an extremely strong but relatively lightweight construction. The lift also includes various accessories for facilitating servicing of the vehicle.

20 Claims, 4 Drawing Sheets

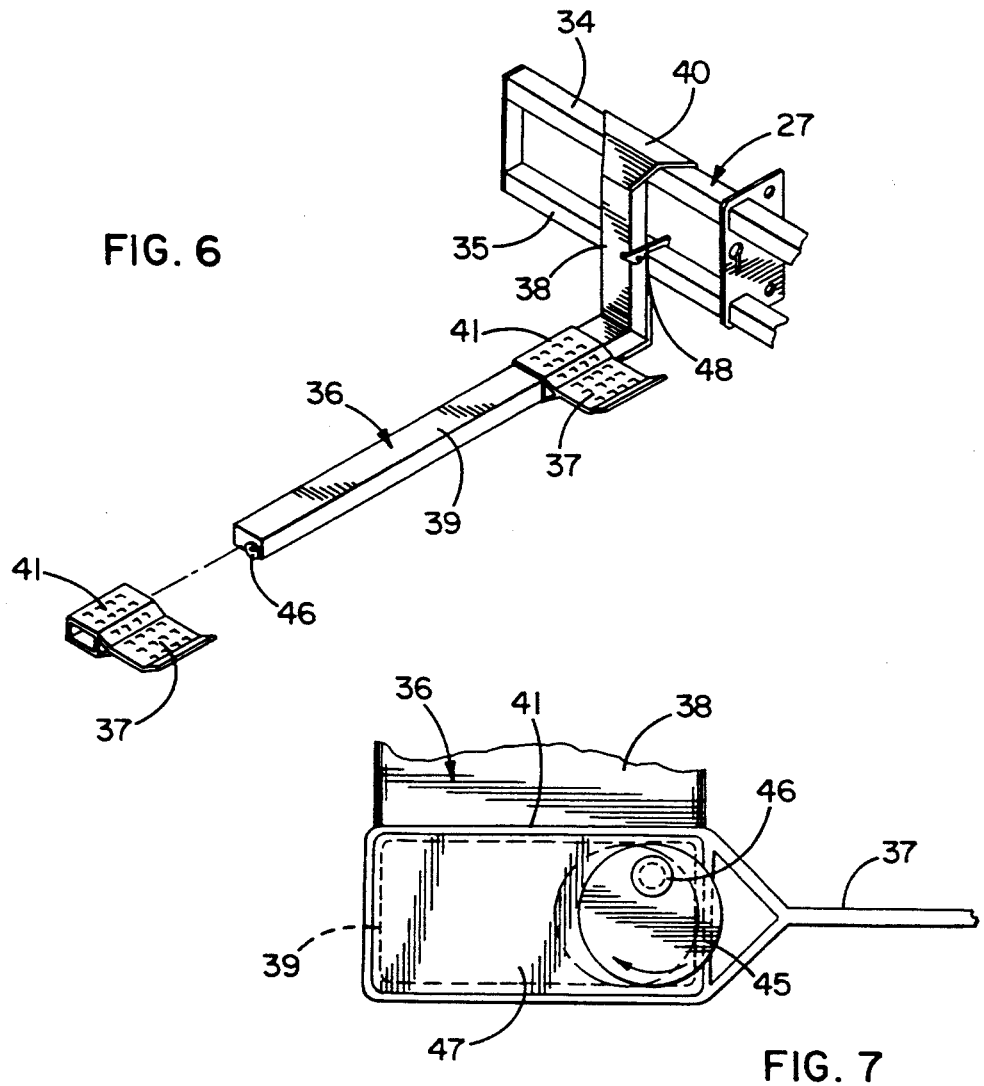
FIG. 6
FIG. 7
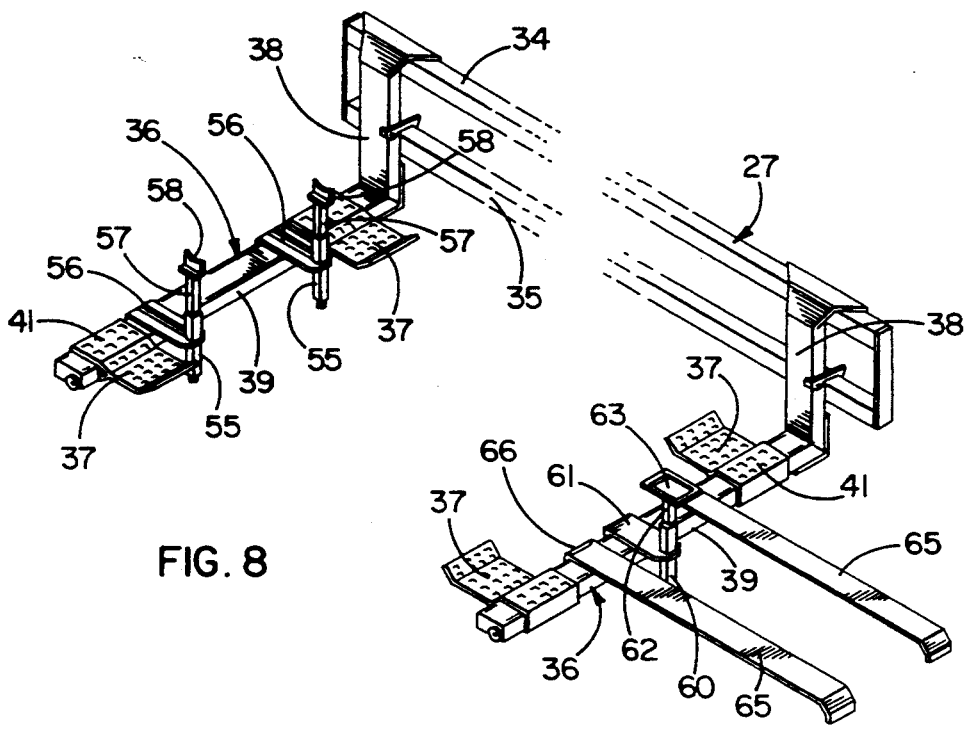
FIG. 8

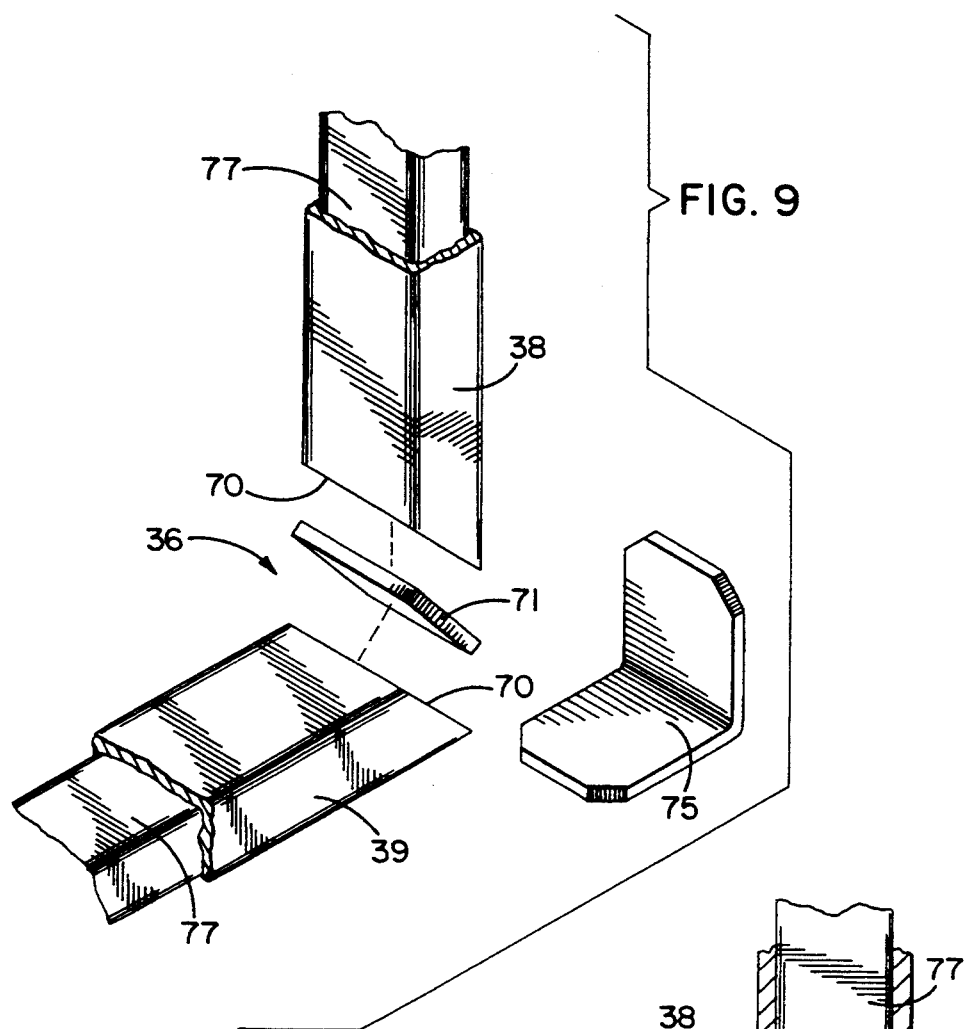
FIG. 9
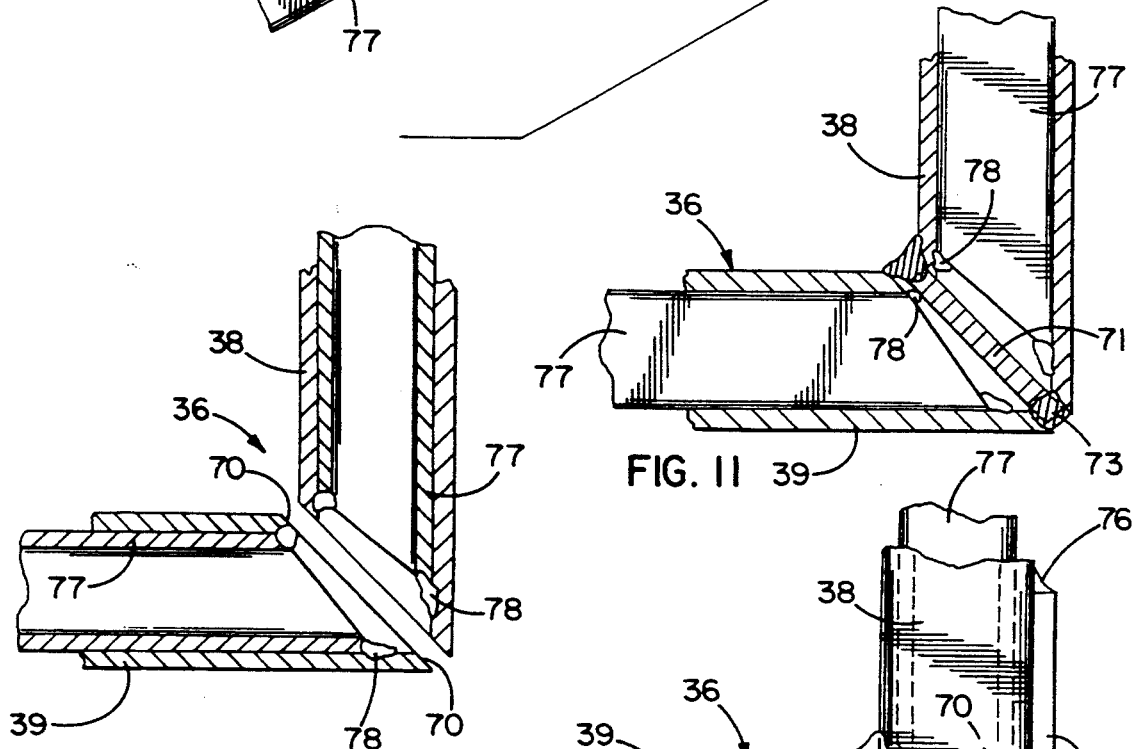
FIG. 10
FIG. 11
FIG. 12

VEHICLE SERVICE LIFT

BACKGROUND OF THE INVENTION

This invention relates to a service lift for a wheeled vehicle such as a garden tractor, a golf cart or an ATV. The purpose of the lift is to raise the vehicle to a level where a serviceman can gain convenient access to the underside of the vehicle for purposes of repair or maintenance.

SUMMARY OF THE INVENTION

The general aim of the present invention is to provide a new and improved vehicle service lift which is safe, versatile and user friendly.

A more detailed object of the invention is to achieve versatility by providing a service lift having a pair of forks which carry cups for supporting the wheels of the vehicle. The forks are adjustable to accommodate the longitudinal wheelbase of the vehicle while the cups are adjustable both to accommodate the longitudinal wheelbase and the transverse wheelbase.

Another object is to provide a lift in which the wheel-supporting cups are offset from the lift forks to provide free access to the differential, the suspension system and other components of the vehicle.

A further object is to provide a power-operated lifting carriage which is adapted to be caught at one of a plurality of vertically spaced stop positions in the event of failure of the power unit of the lift.

Still another object is to provide tubular lifting forks which are of comparatively lightweight but extremely strong construction.

The invention also resides in other safety features of the lift and in the provision of various accessories for facilitating appropriate support and positioning of various types of vehicle.

These and other objects and advantages of the invention will become more apparent from the following detailed description when taken in conjunction with the accompanying drawings.

BRIEF DESCRIPTION OF THE DRAWINGS

FIG. 6 is a fragmentary perspective view of the lifting carriage and one of the lift forks with one of the wheel-supporting cups being shown exploded away from the fork.

FIG. 7 is an enlarged fragmentary end view of the free end of the fork shown in FIG. 6.

FIG. 8 is a perspective view of the lifting carriage, the lift forks, the wheel-supporting cups and various accessories adapted to be supported by the forks.

FIG. 9 is an exploded perspective view of a portion of one of the lift forks.

FIGS. 10 and 11 are cross-sectional views of the lift fork during successive stages of assembly.

FIG. 12 is a fragmentary side elevational view of the assembled lift fork.

DETAILED DESCRIPTION OF THE PREFERRED EMBODIMENT

Figure 1:
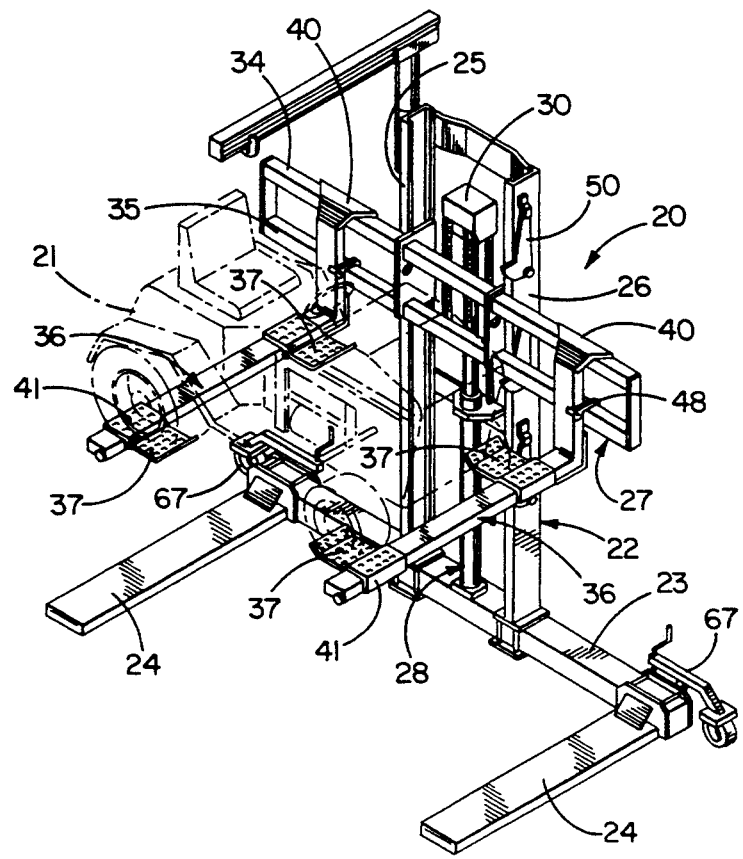
FIG. 1 is a perspective view of a new and improved service lift incorporating the unique features of the present invention, a typical vehicle being shown in phantom on the lift.

As shown in the drawings for purposes of illustration, the invention is embodied in a service lift adapted for use with a wheeled vehicle 21 in order to raise the vehicle to a convenient position facilitating repair or maintenance of the vehicle. Herein, the vehicle has been shown as being a garden tractor. It will be appreciated, however, that the lift could be used in conjunction with golf carts, all-terrain vehicles and similar types of vehicles.

In this instance, the lift 20 comprises a main supporting stand 22 having a lower longitudinally extending beam 23 adapted to rest on the floor. Two elongated feet 24 are attached to and extend transversely from the beam and also rest on the floor to stabilize the stand. Herein, the terms "longitudinally" and "transversely" are used with reference to the longitudinal and transverse axes, respectively, of the vehicle.

Figure 2:
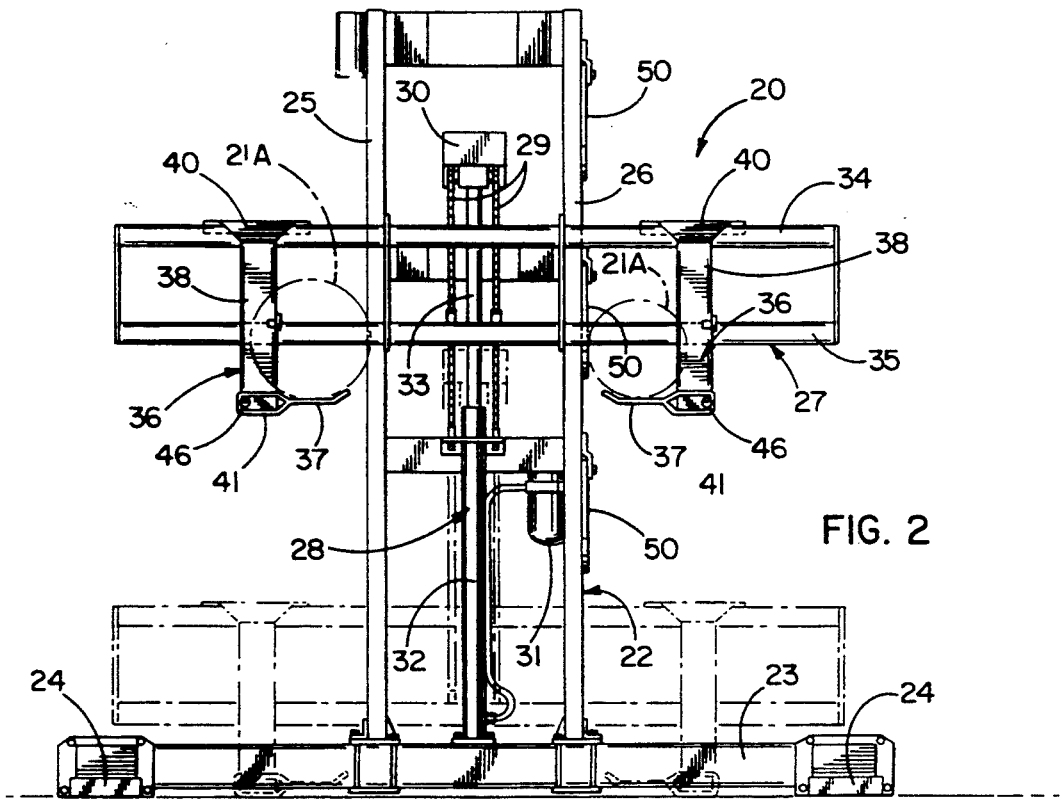
FIG. 2 is an enlarged front elevational view of the lift shown in FIG. 1.
Figure 3:
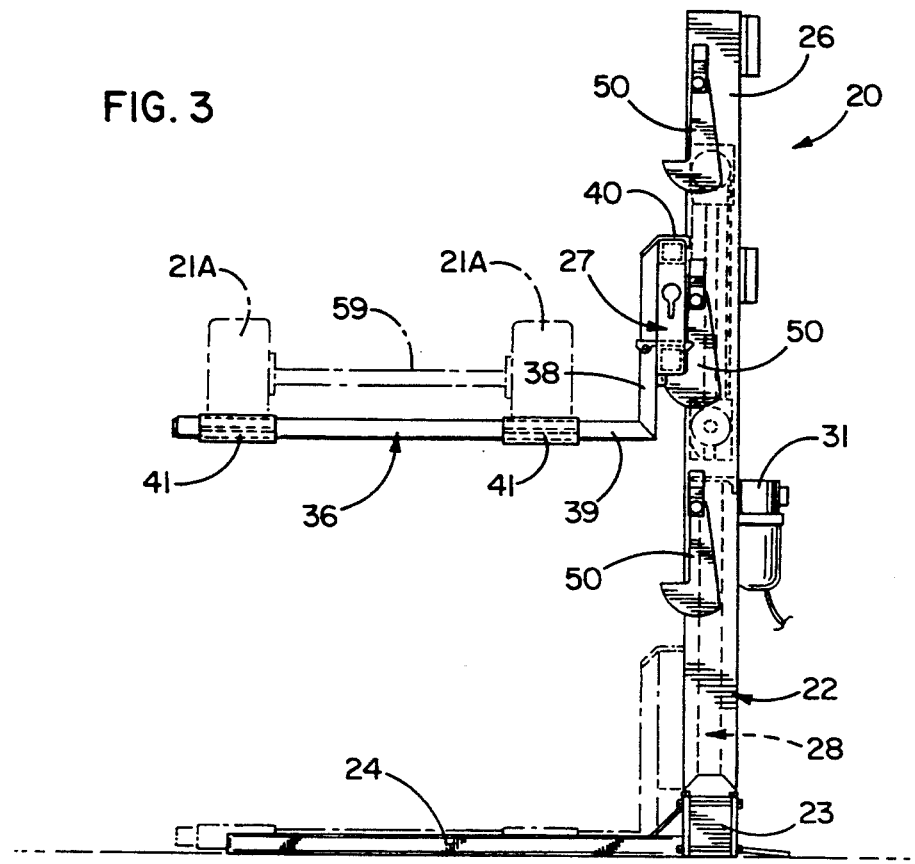
FIG. 3 is a side elevational view of the lift.

The supporting stand 20 further includes a mast which is defined by two longitudinally spaced frame members or columns 25 and 26 attached to and extending upwardly from the beam 23. A longitudinally extending carriage 27 is supported by the columns for vertical movement to a highly elevated position from a position closely adjacent the floor as shown in phantom lines in FIGS. 2 and 3. Such movement is effected by conventional power-operated means including a reciprocating hydraulic actuator 28, a pair of chains 29 and a sprocket assembly 30. An electro/hydraulic power pack 31 (FIG. 2) on the column 26 supplies pressurized fluid to the cylinder 32 of the actuator 28 in order to extend the ram 33 thereof.

The carriage 27 is formed by upper and lower longitudinally extending and parallel rails 34 and 35 which are connected rigidly to one another. Two transversely extending and longitudinally spaced lift forks 36 are attached to the upper rail 34 of the carriage 27.

According to one aspect of the present invention, the lift forks 36 carry wheel-supporting cups 37 adapted to cradle the wheels 21A of the vehicle 21, the cups being uniquely constructed so as to be capable of being adjusted to accommodate both the transverse wheelbase and the longitudinal wheelbase of the vehicle while enabling comparatively free access to the underside of the vehicle. In addition, the lift forks 36 themselves may be adjusted along the carriage 27 to enable the lift 20 to accommodate vehicles having a wide range of longitudinal wheelbases.

Figure 5:
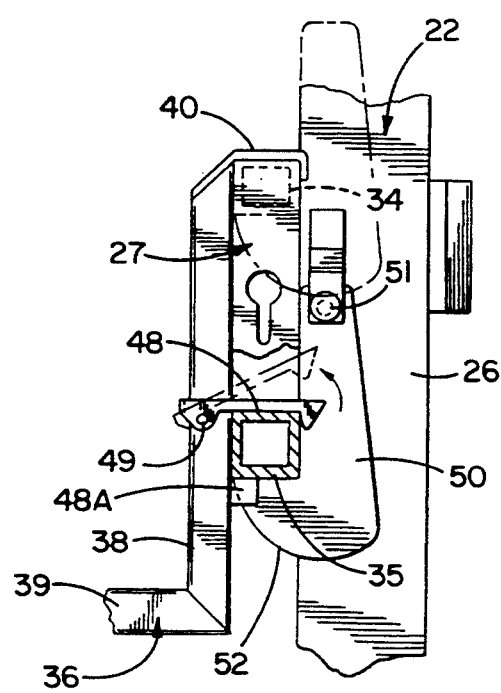
FIG. 5 is a view similar to FIG. 4 but on a still larger scale and with certain parts broken away and shown in section.

More specifically, each lift fork 36 is constructed of steel tubing of rectangular cross-section and includes an upper vertically extending section 38 and a horizontal section 39 extending transversely outwardly from the lower end of the vertical section. Attached to the upper end of each vertically extending section 38 is a bracket 40 (FIGS. 5 and 6) of generally inverted U-shaped cross-section adapted to hook over the upper rail 34 of the carriage 27. By sliding or otherwise repositioning the brackets 40 along the rail 34, the longitudinal spacing between the lift arms 36 may be adjusted.

Each wheel-supporting cup 37 is a shallow and generally U-shaped member which is configured to cradle a wheel 21A. Pursuant to the invention, each cup is attached to and extends longitudinally from a tubular support bracket 41 (FIG. 6) of rectangular cross-section, each bracket being telescoped snugly but slidably onto the horizontal section 39 of the respective lift fork 36. By virtue of the brackets 41, the cups extend longitudinally from the horizontal sections 39 of the forks and thus those sections do not interfere with servicing of the vehicle's differential, suspension system, etc.

The cups 37 may be adjusted to conform to the transverse wheelbase of the vehicle 21 simply by sliding the brackets 41 of the cups along the horizontal section 39 of the lift forks 36. In FIG. 1, the forward cups have been shown as extending rearwardly from the respective lift fork while the rear cups have been shown as extending forwardly from their lift fork. Thus, the cups are set up to accommodate a vehicle having a relatively short longitudinal wheelbase. By reversing one pair of cups, a vehicle with a longer longitudinal wheelbase may be accommodated and, by reversing both pairs of cups, the latter may accommodate a vehicle having a still longer longitudinal wheelbase. If the longitudinal wheelbase cannot be accommodated by adjusting the cups on the lift forks, the latter may be moved closer together or further apart by sliding or otherwise repositioning the brackets 40 on the rail 34.

Advantageously, relatively simple safety means are provided to guard against the wheel cups 37 sliding off of the free ends of the lift forks 36. Herein, these means comprise a simple circular disc 45 (FIG. 7) which is pivotally connected to a vertical cap 47 on the free end of the horizontal section 39 of each fork by a bolt 46 offset radially from the geometric center of the disc, the disc thus constituting an eccentric. The bolt is located at a 12 o'clock position and thus the weight of the eccentric 46 normally causes the eccentric to be disposed as shown in solid lines in FIG. 3. In this position, the eccentric blocks the brackets 41 of the cups 37 and prevents the cups from being slid off of the fork 36. By manually swinging the eccentric about the bolt to the position shown in phantom in FIG. 7, the eccentric may be located in a position aligned with the interior of the tubular brackets 41 so as to permit removal of the cups.

Additional safety means are provided to guard against the lift forks 36 shifting upwardly and also to guard against sidewise tipping of the forks. The aforementioned safety means are in the form of hook-type latches 48 (FIG. 5), there being one latch pivotally attached at 49 to the upper section 38 of each fork to pivot about a longitudinally extending axis. The weight of the latches keeps the latches disposed in a position in which the latches hook around the top and the back of the lower rail 35 of the carriage 27. The latches coact with stop lugs 48A attached to and projecting rearwardly from the upper sections 38 of the forks and positioned to engage the lower side of the lower rail 35.

By virtue of the latches 48 and the lugs 48A, each fork 36 is prevented from being lifted upwardly from the carriage 27 if, for example, the fork should hit an underlying obstruction during lowering of the carriage. Moreover, the forks are prevented from tipping sidewise if, for example, the vehicle 21 is tied down to one of the forks and the balance of the vehicle is upset by removing an engine or the like. By manually pivoting each latch to a released position shown in phantom in FIG. 5, the latch frees the fork for adjustment along or for removal from the carriage.

Figure 4:
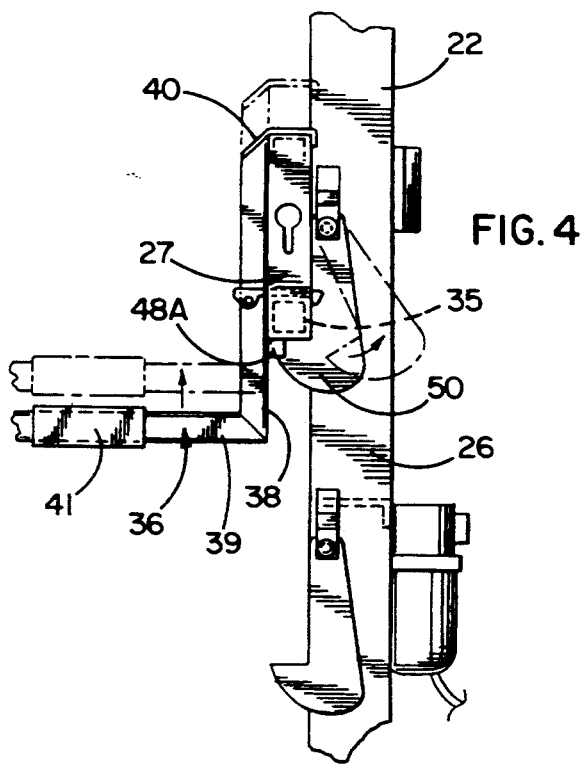
FIG. 4 is an enlarged fragmentary side elevational view of certain components shown in FIG. 3.

The invention also contemplates safety means for catching the carriage 27 and preventing free falling of the carriage to the floor in the event pressure is lost in the hydraulic actuator 28. In this instance, these means comprise three vertically spaced latches 50 (FIGS. 3–5) pivotally mounted at 51 on the outboard side of the column 26 to swing about longitudinally extending axes between latched positions shown in full lines in FIG. 4 and unlatched positions shown in phantom. The weight of the latches biases the latches toward their latched positions in which their lower ends project into the path followed by the carriage 27. Thus, one of the latches will catch one of the rails 34, 35 of the carriage if pressure to the actuator 28 is lost and the carriage starts into a free fall. The latches are spaced about 22" apart while the rails are spaced from one another by about 11". As a result, the carriage cannot free fall through more than about 11" without being caught.

When the carriage 27 is intentionally lowered by virtue of the mechanic relieving the pressure in the actuator 28, the mechanic manually grabs the appropriate latch or latches 50 and swings the same to the unlatched position clearing the carriage and permitting the carriage to move downwardly. During raising of the carriage, the rails 34 and 35 engage and cam against curved lower edges 52 (FIG. 5) of the latches to automatically swing the latches to their unlatched positions and eliminate the need of the mechanic manually holding the latches in such positions. In many cases, the mechanic will prefer to use the latches 50 as a safety support for the carriage 27 while the mechanic is working beneath the vehicle 21.

The lift 20 also may be equipped with several accessories facilitating repair of the vehicle 21. As shown in FIG. 8, two jacks 55 with brackets 56 may be clipped onto one of the lift forks 36. The jacks include vertically extendible rams 57 having heads 58 with concavely curved seats adapted to engage the rear axle 59 (FIG. 3) of the vehicle. The brackets cause the rams to be offset from the forks and aligned with the axle. By using the jacks, the rear of the vehicle may be lifted to raise the rear wheels 21A out of the cups 37 and permit removal of the wheels.

Another jack 60 (FIG. 8 with a clip-on bracket 61 and with a vertically extending ram 62 is shown as being removably attached to the front lift fork 36. The ram 62 of the jack 60 has a head 63 shaped as a shallow pan which may be used to lift the front pivot assembly of the front axle of the vehicle 21. When the jack 62 is positioned on the rear fork, the pan 63 may engage and lift the differential of the vehicle.

Additional accessories include two elongated and longitudinally extending arms 65 (FIG. 8) having brackets 66 which may be clipped onto the forks 36. In FIG. 8, the arms have been shown as clipped to and extending forwardly from the front fork and thus are capable of supporting a front-mounted mower deck attached to the vehicle 21. By reversing the arms on the fork, they may be used to support a belly-mounted mower deck or for supporting other components.

Advantageously, caster wheel units 67 (FIG. 1) optionally may be connected to the ends of the beam 23 in order to make the lift 20 portable. By turning the wheels to and locking the wheels in a position 90 degrees from that shown, the lift forks 36 may be gripped and the lift 20 may be wheeled around in a manner similar to a wheelbarrow.

The present lift 20 is rated to raise a load of 2,000 pounds and has at least a four times safety margin. According to another aspect of the invention, this is achieved through the use of lift forks 36 which are extremely strong and yet relatively light in weight so as to facilitate easy installation, adjustment and removal of the forks.

As shown in FIGS. 9 and 10, the vertical and horizontal tubular sections 38 and 39 of each lift fork 36 are formed with ends 70 each mitered on a 45 degree angle and extending parallel to one another. When the two ends 70 are simply welded together as is conventional practice, the center section of the welded joint does not carry its fair share of the load when vertical forces are applied to the horizontal section 39. Instead, the load is concentrated at the two sides of the weld joint so that the center section of the joint is free to flex and reduce the bending strength of the tubular section to less than one-half that of a straight tube. Pursuant to the invention, the bending strength of the fork 36 is increased significantly by sandwiching a flat plate 71 (FIGS. 9 and 11) between the two mitered ends 70 of the sections 38 and 39 and by welding each end around the periphery of the plate as indicated at 73. By virtue of welding the ends 70 of the tubular sections 38 and 39 to the intervening plate 73, the shape of the joint is resistant to change and thus, when a bending load is applied, the entire cross-section of the tube is stressed substantially equally. This enables the welded construction to carry essentially the same load as a straight, unbroken tube of equivalent size.

Also, a generally L-shaped heel plate 75 is welded at 76 (FIG. 12) to the end portions of the sections 38 and 39 and extends around the outside corner of the joint between the sections. The heel plate 75 thus is located on the compression side of the weld joint 73 to not only add strength and stiffness to the joint but also to move the high stress areas away from the weld so as to increase the resistance of the weld to fatiguing, cracking and breaking under repeated loading.

To add further rigidity to the forks 36 without greatly increasing the weight thereof, short stiffener tubes 77 are placed in each section 38 and 39 and are welded at 78 adjacent the ends 70 of the sections, the welding 78 being effected before the sections are welded to the plate 71. The tubes 77 are significantly shorter than the sections 38 and 39 but add considerable stiffness to the forks 36 to reduce flexing and bouncing of the forks and increase the comfort level of the mechanic as well as the overall safety margin of the lift 20.

We claim:

1. A service lift for a wheeled vehicle, said lift comprising an upright supporting stand, a carriage extending generally longitudinally of the vehicle and mounted on said stand for generally vertical movement, selectively operable power-actuating means for moving said carriage upwardly and downwardly on said stand, a pair of generally horizontal lift forks supported by said carriage and spaced from one another longitudinally of the vehicle, a pair of wheel-supporting cups supported by each of said forks and spaced from one another transversely of the vehicle, said cups being selectively adjustable along said forks to accommodate vehicles with different transverse wheelbases, each of said cups including a tubular mounting bracket telescoped slidably onto the respective fork and further including a wheel-supporting plate joined to said bracket, each wheel-supporting plate extending from the respective bracket and fork in one direction longitudinally of the vehicle, and in one direction only, whereby the space in the opposite direction from the bracket and fork is open and unencumbered so as to provide free access to the underside of the vehicle, and said forks being selectively adjustable along said carriage to enable said cups to accommodate vehicles with different longitudinal wheelbases.

2. A service lift as defined in claim 1 in which each bracket is selectively removable from and is selectively reversible on its respective fork to enable the wheel-supporting plate of its respective cup to extend either forwardly or rearwardly of the vehicle.

3. A service lift as defined in claim 1 further including means selectively operable to retain said cups on said forks.

4. A service lift as defined in claim 3 in which said retaining means comprise eccentrics mounted on the free ends of said forks to turn freely about axes extending transversely of the vehicle, the weight of each eccentric normally causing the eccentric to be oriented in an angular position blocking removal of the cups by engaging the tubular brackets thereof, each eccentric being manually movable to an angular position generally aligned with the interior of said brackets so as to permit removal of said cups from said fork.

5. A service lift as defined in claim 1 further including jacks having brackets adapted to be clipped onto said forks and having vertically extending lifting rams adapted to be removed upwardly and downwardly, said jack brackets extending generally horizontally from said forks in a direction longitudinally of the vehicle and in the same direction as said wheel-supporting plates whereby said lifting rams are offset from said forks.

6. A service lift as defined in claim 5 in which the upper end of the ram of at least one of said jacks carries a head with a concavely curved surface shaped to engage and lift an axle of the vehicle.

7. A service lift as defined in claim 5 in which the upper end of the ram of at least one of said jacks carries a head shaped generally as a pan.

8. A service lift as defined in claim 1 further including extension arms having a length substantially greater than the length of said cups, said arms including brackets adapted to be clipped on said forks with said arms extending longitudinally of the vehicle.

9. A service lift as defined in claim 1 in which each of said forks includes a tubular vertical section of rectangular cross-section and further includes a horizontal section of rectangular cross-section extending at right angles to said vertical section, said sections having adjacent ends each cut on a 45 degree angle and extending parallel to one another, a flat rectangular plate sandwiched between said adjacent ends, and a weld extending around the periphery of said plate and securing the end of each section of said plate.

10. A service lift for a wheeled vehicle, said lift comprising an upright supporting stand, a carriage extending generally longitudinally of the vehicle and mounted on said stand for generally vertical movement, selectively operable power-actuated means for moving said carriage upwardly and downwardly on said stand, a pair of generally horizontal lift forks supported by said carriage and spaced from one another longitudinally of the vehicle, a pair of wheel-supporting cups supported by each of said forks and spaced from one another transversely of the vehicle, said cups being selectively adjustable along said forks to accommodate vehicles with different transverse wheelbases, said forks being selectively adjustable along said carriage to enable said cups to accommodate vehicles with different longitudinal wheelbases, said supporting stand including an upright frame member, a plurality of vertically spaced latches supported on said frame member to pivot about axes extending longitudinally of said vehicle, the weight of said latches normally causing said latches to project into the path of said carriage whereby one of said latches will catch said carriage in the event failure of said power-actuated means allows said carriage to start into a free fall.

11. A service lift as defined in claim 10 in which each of said latches is manually movable to an unlatched position permitting lowering of said carriage.

12. A service lift as defined in claim 11 in which each of said latches includes a cam surface adapted to be engaged by said carriage during raising of said carriage, engagement of said carriage with said cam surfaces causing said latches to pivot automatically to said unlatched positions.

13. A service lift for a wheeled vehicle, said lift comprising an upright supporting stand having at least one vertically extending frame member, a carriage extending generally longitudinally of the vehicle and mounted on said stand for generally vertical movement, a pair of lift forks supported by said carriage and spaced from one another longitudinally of the vehicle, a pair of wheel-supporting cups supported by each of said forks and spaced from one another transversely of the vehicle, selectively operable power-operated means for moving said carriage upwardly and downwardly on said stand, a plurality of vertically spaced latches supported on said frame member to pivot about axes extending longitudinally of the vehicle, the weight of said latches normally causing said latches to project into the path of said carriage whereby one of said latches will catch said carriage in the event failure of said power-actuated means allows said carriage to start into a free fall.

14. A service lift as defined in claim 13 in which each of said latches is manually movable to an unlatched position permitting lowering of said carriage.

15. A service lift as defined in claim 14 in which each of said latches includes a cam surface adapted to be engaged by said carriage during raising of said carriage, engagement of said carriage with said cam surfaces causing said latches to pivot automatically to said unlatched positions.

16. A service lift for a wheeled vehicle, said lift comprising an upright supporting stand, a carriage extending generally longitudinally of the vehicle and mounted on said stand for generally vertical movement, selectively operable power-actuated means for moving said carriage upwardly and downwardly, a pair of lift forks supported by said carriage and spaced from one another longitudinally of the vehicle, a pair of wheel-supporting cups supported by each of said forks and spaced from one another transversely of the vehicle, each of said forks having a tubular vertical section of rectangular cross-section and having a horizontal section of rectangular cross-section extending at right angles to said vertical section, said sections having adjacent ends each cut on a 45 degree angle and extending parallel to one another, a flat rectangular plate sandwiched between said adjacent ends, and a weld extending around the periphery of said plate and securing the end of each section to said plate.

17. A service lift as defined in claim 16 in which each fork further includes a generally L-shaped plate extending around the outside corner between said adjacent ends and welded to the lower side of said horizontal section and the adjacent side of said vertical section.

18. A service lift as defined in claim 17 in which each fork further includes stiffener tubes of rectangular cross-section disposed in said vertical and horizontal sections, said stiffener tubes being significantly shorter than said horizontal and vertical sections and being welded to the latter just short of said adjacent ends.

19. A service lift for a wheeled vehicle, said lift comprising an upright supporting stand, a carriage extending generally longitudinally of the vehicle and mounted on said stand for generally vertical movement, selectively operable power-actuated means for moving said carriage upwardly and downwardly on said stand, a pair of generally horizontal lift forks supported by said carriage and spaced from one another longitudinally of the vehicle, a pair of wheel-supporting cups supported by each of said forks and spaced from one another transversely of the vehicle, said cups being selectively adjustable along said forks to accommodate vehicles with different transverse wheelbases, said forks being selectively adjustable along said carriage to enable said cups to accommodate vehicles with different longitudinal wheelbases, said carriage including a pair of vertically spaced rails extending longitudinally of the vehicle, each of said forks having a vertically extending section and a horizontal transversely extending section at the lower end of the vertically extending section, a bracket on the upper end of the vertically extending section of each fork and adapted to clip onto said upper rail, a lug on the lower end portion of the vertically extending section of each fork and positioned to underlie and engage said lower rail, and a pivoted latch on each vertically extending section between the ends thereof and coacting with said lug to releasably lock the respective fork to said lower rail.

20. A service lift for a wheeled vehicle, said lift comprising an upright supporting stand, a carriage extending generally longitudinally of the vehicle and mounted on said stand for generally vertical movement selectively operable power-actuated means for moving said carriage upwardly and downwardly on said stand, a pair of generally horizontal lift forks supported by said carriage and spaced from one another longitudinally of the vehicle, a pair of wheel-supporting cups supported by each of said forks and spaced from one another transversely of the vehicle, said cups being selectively adjustable along said forks to accommodate vehicles with different transverse wheelbases, said forks being selectively adjustable along said carriage to enable said cups to accommodate vehicles with different longitudinal wheelbases, said supporting stand including a lower beam extending longitudinally of the vehicle beneath said carriage and adapted to rest on a floor, a pair of elongated feet attached to end portions of said beam and spaced longitudinally of the vehicle, said feet extending in the same direction as said forks and adapted to rest on the floor, the spacing between said feet being greater than the maximum spacing between said forks, the horizontal space between said feet adjacent said floor being substantially open and unencumbered, and the vertical space between said feet and said forks also being substantially open and unencumbered.

* * * * *